US010531330B2

(12) United States Patent
Ranson et al.

(10) Patent No.: US 10,531,330 B2
(45) Date of Patent: Jan. 7, 2020

(54) FRAME START OPTIMIZING IN TELECOMMUNICATIONS SYSTEMS

(71) Applicant: Andrew Wireless Systems GmbH, Buchdorf (DE)

(72) Inventors: Christopher Goodman Ranson, Concord, VA (US); Keld Knut Lange, Oetisheim (DE)

(73) Assignee: Andrew Wireless Systems GmbH, Buchdorf (DE)

( * ) Notice: Subject to any disclaimer, the term of this patent is extended or adjusted under 35 U.S.C. 154(b) by 0 days.

(21) Appl. No.: 15/575,753

(22) PCT Filed: Jan. 19, 2016

(86) PCT No.: PCT/IB2016/050252
§ 371 (c)(1),
(2) Date: Nov. 20, 2017

(87) PCT Pub. No.: WO2016/185291
PCT Pub. Date: Nov. 24, 2016

(65) Prior Publication Data
US 2018/0124635 A1    May 3, 2018

Related U.S. Application Data

(60) Provisional application No. 62/164,047, filed on May 20, 2015.

(51) Int. Cl.
*H04W 28/02*    (2009.01)
*H04B 7/08*    (2006.01)
(Continued)

(52) U.S. Cl.
CPC .......... *H04W 28/0278* (2013.01); *H04B 7/08* (2013.01); *H04L 12/56* (2013.01);
(Continued)

(58) Field of Classification Search
CPC .. H04W 28/0278; H04W 56/001; H04B 7/08; H04L 12/56; H04L 45/245; H04L 47/30
See application file for complete search history.

(56) References Cited

U.S. PATENT DOCUMENTS 5,177,739 A * 1/1993 Basnuevo ............. H04J 3/0682
370/449
6,775,301 B1    8/2004 Kroll et al.
(Continued)

FOREIGN PATENT DOCUMENTS

WO    9116776 A1    10/1991

OTHER PUBLICATIONS

International Searching Authority, "International Search Report from PCT Application No. PCT/IB2016/050252 filed on Jan. 19, 2016" "from foreign counterpart of U.S. Appl. No. 62/164,047", dated Apr. 5, 2016, pp. 1-11, Published in WO.

*Primary Examiner* — Ricky Q Ngo
*Assistant Examiner* — Stephen N Steiner
(74) *Attorney, Agent, or Firm* — Fogg & Powers LLC

(57) ABSTRACT

The present disclosure describes devices, systems, and methods for frame start optimizing in telecommunication systems. Some aspects may involve receiving, by an aggregation device in the telecommunication system, frames from transmitter devices. Some aspects may also involve determining that buffering may be required to sequence the frames for an aggregation operation performed by the aggregation device. The aggregation operation may include a process that combines frames from transmitter devices. In response to determining that the buffering is required, frame adjustment signals may be transmitted to the transmitter devices. The frame adjustment signals may instruct the transmitter devices to transmit subsequent frames such that the buffering is reduced for a subsequent aggregation opera- (Continued)

tion performed by the aggregation device using the subsequent frames.

20 Claims, 9 Drawing Sheets

(51) Int. Cl.
    *H04L 12/54*     (2013.01)
    *H04L 12/709*     (2013.01)
    *H04L 12/835*     (2013.01)
    *H04W 56/00*     (2009.01)

(52) U.S. Cl.
    CPC ............ *H04L 45/245* (2013.01); *H04L 47/30* (2013.01); *H04W 56/001* (2013.01)

(56) References Cited

U.S. PATENT DOCUMENTS

| | | | |
|---|---|---|---|
| 2004/0057543 A1* | 3/2004 | Huijgen | H04J 3/0682 375/356 |
| 2006/0209752 A1* | 9/2006 | Wijngaarden | H04W 4/04 370/328 |
| 2011/0032910 A1* | 2/2011 | Aarflot | H04J 3/0682 370/335 |

* cited by examiner

FRAME START OPTIMIZING IN TELECOMMUNICATIONS SYSTEMS

CROSS-REFERENCE TO RELATED APPLICATIONS

This application is a U.S. National Stage Application of PCT Application Serial No. PCT/IB2016/050252, filed 19 Jan. 2016 and titled "FRAME START OPTIMIZING IN TELECOMMUNICATIONS SYSTEMS", which claims benefit to U.S. Provisional Application Ser. No. 62/164,047, filed May 20, 2015 and titled "Frame Start Optimization in Digital Distributed Antenna Systems," the contents of both of which are incorporated herein by reference.

TECHNICAL FIELD

The present disclosure relates generally to telecommunications and, more particularly (although not necessarily exclusively), to optimizing frame start times in telecommunication systems.

BACKGROUND

Examples of a telecommunication system may include a distributed antenna system ("DAS"), a repeater, or a radio access network. The telecommunication system can be communicatively coupled to base stations, such as (but not limited to) an eNodeB that is compliant with a Long Term Evolution ("LTE") standard.

The telecommunication system can be used to provide wireless communication coverage in a variety of environments, particularly in large structures such as office buildings, convention halls, airports, stadiums, and the like. A DAS, for example, can include one or more head-end units (e.g., master units) that are communicatively coupled to one or more base stations. The DAS can also include multiple remote units that are communicatively coupled to a head-end unit. The remote units, each of which can include one or more transceivers and antennas, can be distributed across a coverage area. The remote units can transmit downlink signals, such as signals transmitted by a base station, to mobile phones or other terminal devices within coverage areas serviced by the remote units. Remote units can also receive uplink signals from terminal devices and transmit the uplink signals to the head-end unit of the DAS, which can provide the uplink signals to a base station.

SUMMARY

The present disclosure describes devices, systems, and method for frame start optimizing in telecommunication systems.

In some aspects, a method is provided. The method can involve receiving, by an aggregation device in a telecommunication system, frames from transmitter devices. The method can further involve determining that buffering is required for at least some of the frames to sequence the frames for an aggregation operation performed by the aggregation device. The aggregation operation may include a process that combines frames from transmitter devices. The method can further involve, in response to determining that the buffering is required, transmitting frame adjustment signals to the transmitter devices. The frame adjustment signals may instruct the transmitter devices to transmit subsequent frames such that the buffering is reduced for a subsequent aggregation operation performed by the aggregation device using the subsequent frames.

In other aspects, a telecommunication system is provided. The telecommunications system can include an aggregation device and a frame adjustment processor. The aggregation device can receive frames from transmitter devices and perform aggregation operations. The frame adjustment processor may be communicatively coupled to the transmitter devices. The frame adjustment processor can determine that buffering is required for at least some frames to sequence the frames for an aggregation operation performed by the aggregation device. The frame adjustment processor can also transmit frame adjustment signals to the transmitter devices to instruct the transmitter devices to transmit subsequent frames such that buffering is reduced for a subsequent aggregation operation performed by the aggregation device using the subsequent frames.

In other aspects, a non-transitory computer-readable medium is provided. The non-transitory computer-readable medium may have instructions stored thereon that are executable by a frame adjustment processor to perform operations. The operations may include transmitting frame adjustment signals to transmitter devices. The frame adjustment signals may instruct the transmitter devices to transmit frames to an aggregation device in a telecommunication system such that buffering is reduced for an aggregation operation performed by the aggregation device using the frames.

DETAILED DESCRIPTION

Figure 1:
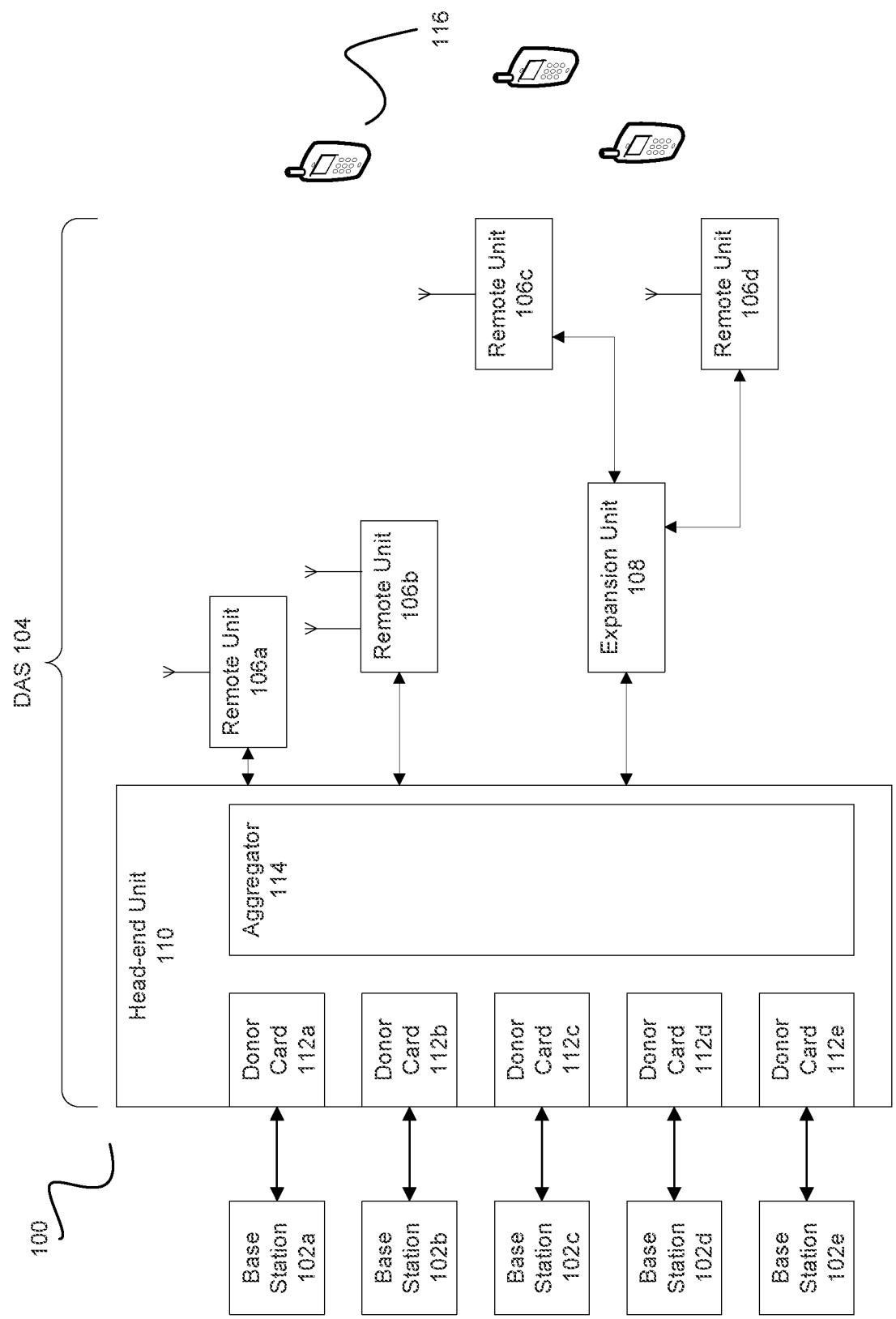
FIG. 1 shows a block diagram of an example of a telecommunication system that includes a distributed antenna system ("DAS") communicatively coupled to a base station according to one aspect of the present disclosure.

The present disclosure relates to optimizing the transmission of frames to an aggregation device in a telecommunication system. An aggregation device may include a summer or other circuitry to combine signals. Examples of units in which aggregation devices may be located include head-end units and expansion units. Optimizing the transmission of frames to an aggregation device may involve reducing delay, power cost, or error rate associated with the aggregation device.

In some aspects, a frame adjustment processor determines that frame transmission is sub-optimal and outputs instructions to delay or otherwise modify the transmission of subsequent frames. More specifically, the frame adjustment processor may determine that buffering is required for an aggregation device to complete an aggregation operation. The frame adjustment processor may respond to this determination by transmitting instructions to transmitter devices. The instructions can cause the transmitter devices to transmit subsequent frames such that subsequent buffering is reduced. Examples of transmitter devices include base stations and remote units.

A telecommunication system can be any type of system for extending wireless coverage. Examples of a telecommunication system include a distributed antenna system ("DAS"), a repeater, or a radio access network. Devices in a telecommunication system can be communicatively coupled via digital links using one or more suitable protocols. Examples of suitable protocols for a digital link include Ethernet, synchronous Ethernet, Common Public Radio Interface ("CPRI"), Synchronous Optical Networking ("SONET"), etc.

For synchronous Ethernet communication links, Ethernet frames can be communicated between the head-end unit and the remote units. The Ethernet frames can include control data for managing communication links and payload data that can digitally represent signals to or from terminal devices in communication with one or more base stations. In one example, system delay can be kept as low as possible, and a pre-determined delay can be achieved through the telecommunication system.

An aggregation device can receive multiple frames (e.g., Ethernet frames) from respective transmitter devices. The aggregation device can determine that the times at which the different frames are received are sub-optimal for an aggregation operation. For example, the times at which the different frames are received may cause the aggregation device to buffer at least some of the received frames prior to performing an aggregation operation.

Aligning or other sequencing the frames can be used to reduce the delay through the telecommunication system. Sequencing frames may include transmitting one or more frame adjustment signals (e.g., commands to advance or delay frame start times) to one or more transmitter devices. The frame adjustment commands can cause the transmitter devices to advance or delay frame start times such that frames are received at the aggregation device at times that optimize the aggregation operation of the aggregation device.

In some aspects, the aggregation operation may include combining uplink data received from multiple remote units. The sub-optimal frame timing may involve the received frames having different start times. In additional or alternative aspects, the aggregation operation may include combining downlink data received from multiple base stations using a time-division multiple-access scheme. The sub-optimal frame timing may involve the received frames having the same start times or being received in a different sequence than a sequence of time slots used for the time-division multiple-access scheme.

FIG. 1 depicts an example of a telecommunication system 100. The telecommunication system 100 includes a DAS 104 communicatively coupled to base stations 102*a-e*. Although a DAS 104 is depicted in FIG. 1 as an example, other types of telecommunication system, such as a repeater or radio access network, can be used. The base stations 102*a-e* can be used by one or more cellular providers that employ different air interfaces.

The DAS 104 depicted in FIG. 1 includes a head-end unit 110 communicatively coupled to base stations 102*a-e*. In some examples, a DAS can include one or more head-end units that are communicatively coupled to the base stations 102*a-e*. The head-end unit 110 includes an aggregator 114 and donor cards 112*a-e*. Some examples may not include donor cards, while other examples may include the donor cards in another device (e.g., a base station router) that can be communicatively coupled to the head-end unit 110 and one or more base stations 102*a-e*. The donor cards 112*a-e* can provide information to the aggregator 114 using synchronous Ethernet frames. In some examples, the aggregator 114 may be included in a base station, a remote unit, an expansion unit, or another suitable device. In a downlink direction, as well as an uplink direction, the aggregator 114 can aggregate frames from multiple channels into one or more combined frames.

The DAS 104 also includes multiple spatially separated remote units 106*a-d* that are communicatively coupled to the head-end unit 110. An expansion unit 108 can be included in the DAS 104 to communicatively couple the head-end unit 110 to additional remote units 106*c-d*. In other examples, a DAS may have no expansion units or more than one expansion unit to extend the number of remote units in the system. The remote units 106*a-d* can provide signal coverage in one or more coverage zones to terminal devices 116. The remote units 106*a-d* can include transceiving devices that can include or be communicatively coupled to one or more antennas.

In one example, the head-end unit 110 can be or include an aggregation device and can receive a first set of frames. Each frame in the first set of frames can be received from a respective transmitter device, such as one of the base stations 102*a-e*. In some aspects involving downlink frames, the transmitter devices can be base stations 102*a-e* or donor interface cards in the telecommunication system 100 that are communicatively coupled to base stations 102*a-e*. In other aspects involving uplink frames, the transmitter devices can be remote units 106*a-d*, the expansion unit 108, or both.

The head-end unit 110 can determine a respective arrival time for each frame in the first subset of frames. For example, a first frame may be received at a first point in time, which may be measured by a counter and indicated by the counter having a value of zero. A second frame may be received at a second point in time, which may be measured by the counter (or another synchronized counter) and indicated by a counter value of ten.

The head-end unit 110 can determine that the frame arrival times are sub-optimal for an aggregation operation to be performed by aggregator 114. The head-end unit 110 can transmit a frame adjustment command to the base stations 102*a-e* from which one or more of the first and second frames were received. A frame adjustment command may instruct a first base station from which the first frame was received to delay the start time at which subsequent frames are transmitted. Additionally or alternatively, a frame adjustment command may instruct a second base station from which the second frame was received to advance the start time at which subsequent frames are transmitted. The head-end unit 110 can subsequently receive a second set of frames. Each frame in the second set of frames can be received by the head-end unit 110 at a respective time that can optimize the aggregation operation of the aggregator 114.

Figure 2:
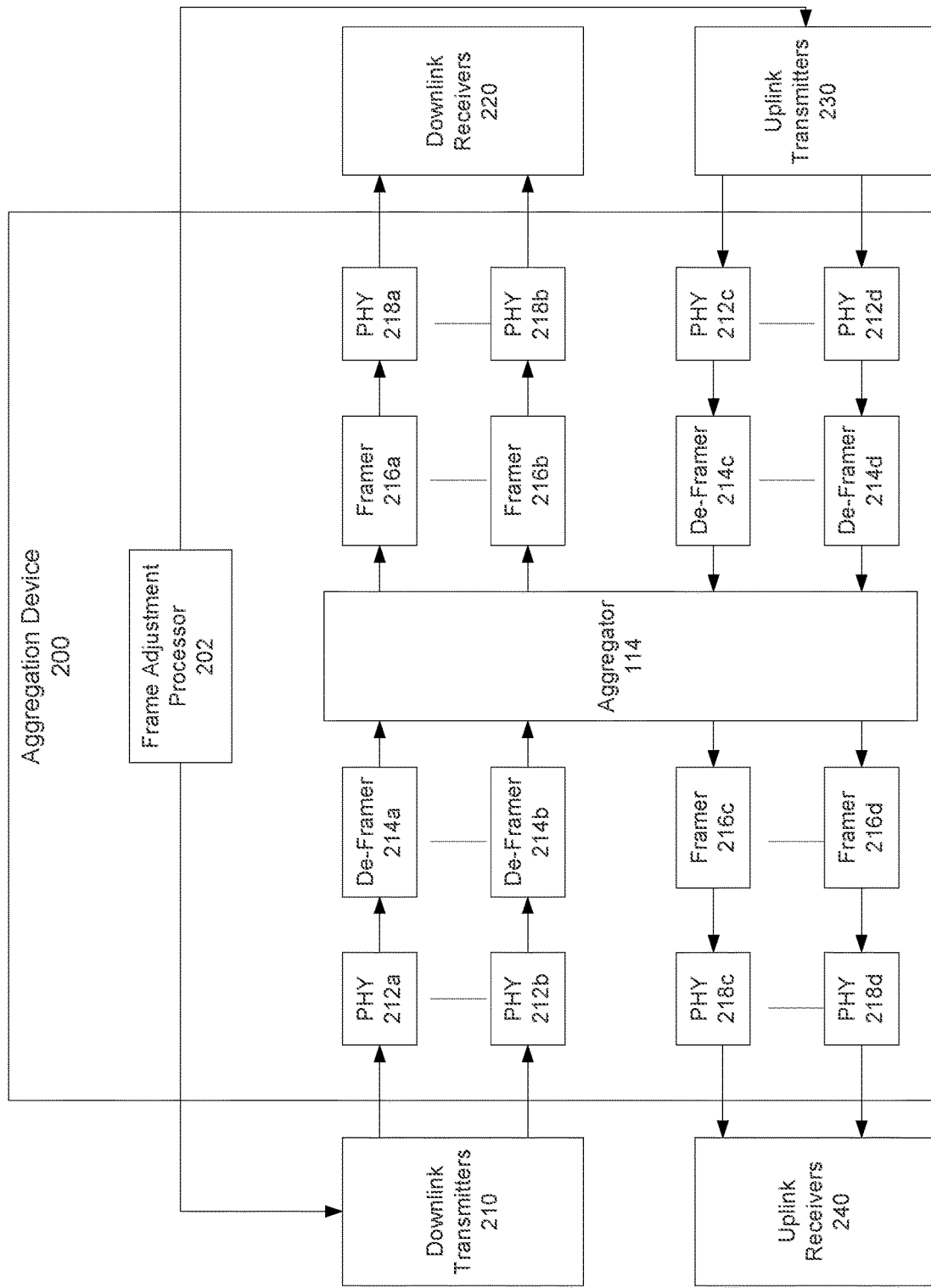
FIG. 2 is a block diagram of an example of an aggregation device including a frame adjustment processor in a telecommunication system according to one aspect of the present disclosure.

FIG. 2 depicts an example of an aggregation device 200 in a telecommunication system that can be used to optimize frame sequencing. Optimizing frame sequencing in the telecommunication system can reduce one or more of cost and power requirements in a telecommunication system. By intelligently aligning or otherwise sequencing frames, the delay through the telecommunication system can be minimized or otherwise reduced. Minimizing or reducing the delay can reduce the amount of memory required in one or more devices of the telecommunication system. Reducing the required amount of memory may reduce one or more of cost and power requirements in the telecommunication system.

Examples of the aggregation device 200 include a head-end unit, an expansion unit, or any other device in a telecommunication system that may aggregate data from multiple frames into a common frame. The aggregation device 200 includes physical layer ("PHY") devices 212a-d, 218a-d. PHY devices 212a-b can be communicatively coupled to downlink transmitters 210 (e.g., base stations, head-end units, etc.). PHY devices 218a-b can be communicatively coupled to downlink receivers 220 (e.g., expansion units, remote units, etc.). PHY devices 212c-d can be communicatively coupled to uplink transmitters 230 (e.g., remote units, expansion units, etc.). PHY devices 218c-d can be communicatively coupled to uplink receivers 240 (e.g., base stations, donor cards, head-end units, etc.). The transmitter devices (e.g. downlink transmitters 210, uplink transmitters 230) can include transceivers, amplifiers, attenuators, buffers, or microprocessors, as well as other circuitry. The transceivers may include or be communicatively coupled to one or more antennas.

In the downlink direction, one or more of the PHY devices 212a, 212b can receive an Ethernet frame from downlink transmitters 210 and provide the received frame to buffers (not shown in FIG. 2). One or more of the buffers may delay one or more received Ethernet frames to align the frames in time. The time-aligned Ethernet frames can be provided to de-framers 214a, 214b. The de-framers 214a, 214b can extract payload data, which represents downlink signals to be transmitted to terminal devices, from the Ethernet frames.

The buffers may also be implemented in other ways. For example, one or more buffers may be positioned between the respective de-framers 214a, 214b and an aggregator 114. The aggregator 114 can combine the extracted payload data to generate combined downlink data. The framer 216a, 216b can frame the combined downlink data into a common Ethernet frame and provide the Ethernet frame to PHY devices 218a, 218b for transmission to downlink receivers 220.

In the uplink direction, the aggregation device 200 (e.g. in a head-end unit or an expansion unit) can aggregate uplink traffic received from uplink transmitters 230. Aggregating signals may involve combining multiple uplink signals onto common Ethernet links, while keeping each packet separate. The aggregation device 200 may also sum uplink signals received from multiple uplink transmitters 230 that are to be transmitted to a given operator.

In some aspects, each uplink transmitter 230 can provide a respective uplink Ethernet frame, which can be generated by the uplink transmitter 230 from an uplink signal received from a terminal device, to a PHY device 212c, 212d in an aggregation device 200. Each PHY device 212c, 212d can provide a received frame to a buffer (not shown in FIG. 2). One or more of the buffers may delay one or more received Ethernet frames to align the frames in time. The time-aligned Ethernet frames can be provided to de-framers 214c, 214d of the aggregation device 200. The de-framers 214c, 214d can extract payload data, which can represent uplink signals (e.g., RF data, IQ data, baseband data, etc.) to be transmitted to one or more uplink receivers 240 from the Ethernet frames. Although the buffers are described as being positioned in a signal path prior to the de-framers 214c, 214d, other implementations are possible. For example, one or more buffers may be positioned between the respective de-framers 214c, 214d and an aggregator 114.

The aggregator 114 in the aggregation device 200 can combine the extracted payload data to generate combined uplink data. The framers 216c, 216d in the aggregation device 200 can frame the combined uplink data into Ethernet frames and can provide the Ethernet frames to PHY devices 218c, 218d for transmission to uplink receivers 240.

The aggregation device 200 can also include a Frame Adjustment Processor ("FAP") 202. The FAP 202 can determine that the frames received by the aggregation device 200 require buffering. The FAP 202 can transmit instructions to the transmitter devices (e.g. downlink transmitters 210, uplink transmitters 230) to reduce the required buffering for subsequent frames.

In some aspects, an aggregation device 200 may sum or otherwise combine uplink data from uplink transmitters 230 that represents the same uplink signal. In one example, the uplink transmitters may be included in two or more remote units. Each remote unit may receive an uplink signal from a terminal device and transmit a respective Ethernet frame having payload data that represents the uplink signal. An aggregation device 200 can receive the two Ethernet frames and extract the two sets of payload data representing the same uplink signal. The aggregation device 200 can combine the two sets of payload data into a single set of payload data (e.g., by summing). The aggregation device 200 can generate a new Ethernet frame that includes the single set of payload data representing the summed uplink data. The FAP 202 can determine that in this aggregation operation, buffering can be reduced at the aggregation device 200 if the Ethernet frames are received by the aggregation device 200 at the same time. To reduce the required buffering for subsequent frames, the FAP 202 can transmit instructions to the remote units such that subsequent frames are received closer in time.

Figure 3:
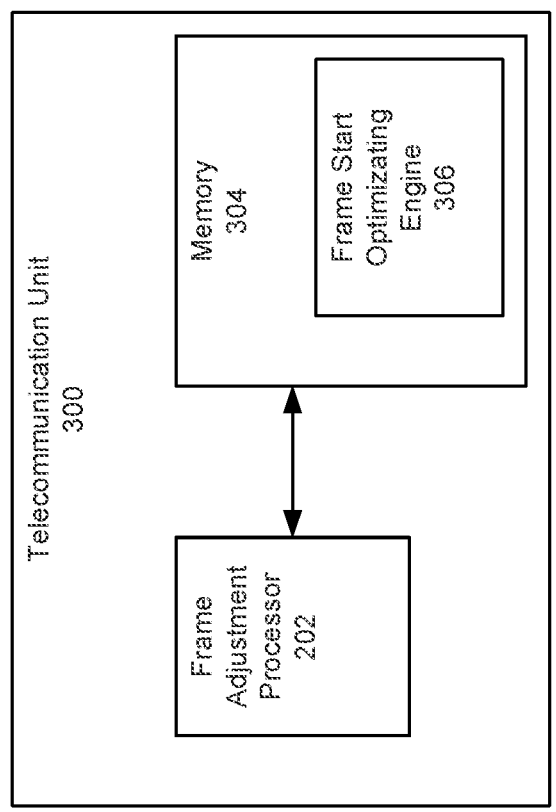
FIG. 3 shows a block diagram of a telecommunication unit including a frame adjustment processor that can communicate with transmitter devices to optimize frame transmission according to one aspect of the present disclosure.

FIG. 3 depicts a block diagram of an example of a telecommunication unit 300 with a FAP 202. The telecommunication unit 300 can be a head-end unit, an expansion unit, one or more of the remote units, one or more of the base stations, or any other suitable device in a telecommunication system. Examples of a FAP 202 include a microprocessor, an application-specific integrated circuit ("ASIC"), a field-programmable gate array ("FPGA"), or other suitable processor. In some aspects, the FAP 202 can be a dedicated processing device used for frame optimization or adjustment. In other aspects, the FAP 202 can be a processing device included in or communicatively coupled with an aggregator that can perform functions in addition to frame optimization or adjustment.

The FAP 202 can include (or be communicatively coupled with) a non-transitory computer-readable memory 304. The non-transitory computer-readable memory 304 can include one or more memory devices that can store program instructions. The program instructions can include, for example, a frame start optimization engine 306 that is executable by the FAP 202 to perform certain operations described herein.

The FAP 202 can monitor incoming frames from multiple sources such as, for example, multiple base stations in the downlink direction and multiple remote units in the uplink direction, etc. The FAP 202 can measure the start-of-frame time for each source. The start-of-frame time can be determined by searching the incoming stream for a start-of-frame control character.

In some aspects, the FAP 202 can start a synchronous counter for each incoming Ethernet frame. The FAP 202 can compare multiple counters for respective frames. The FAP 202 can determine a difference in the compared counters. The start frame delta (e.g., the difference between start-of-frame times) can be determined by calculating the difference in the separate counters for each frame. The differences can be analyzed to determine the start time difference for each of the incoming streams.

The FAP 202 can perform a process to align or otherwise modify the sequencing of frames and minimize or otherwise reduce the frame buffer delay. In some aspects, the process can be performed during a delay calibration of the telecommunication system. The FAP 202 can determine the delta delay between frames as described above. The FAP 202 can transmit frame adjustment commands to a transmitter device (e.g., a remote unit in the uplink direction, a base station in the downlink direction, etc.). Examples of frame adjustment commands include frame-advance commands and frame-delay commands. The frame-advance command can include a time parameter that indicates the amount by which frames are to be advanced. The frame-delay command can include a time parameter that indicates the amount by which frames are to be delayed. The time parameter in a frame adjustment command can be expressed in any suitable unit (e.g., units of seconds, units of bit-times based on the Ethernet bit rate, etc.).

In some aspects, the frame adjustment commands may be transmitted by the FAP 202 using messaging that is part of the Ethernet protocol or other protocol used to communicate framed data. In some aspects, a frame adjustment command may be included in a frame adjustment field (e.g., a frame-advance field, a frame-delay field, etc.) in the payload portion of a frame. The frame adjustment field in the payload portion can indicate the number of bits by which a transmitter device is to advance or delay the frame. In additional or alternative aspects, specialized Ethernet frames may be used to transmit the frame adjustment commands from the aggregation device to the transmitter device. In additional or alternative aspects, one or more communication links separate from the link used for transmitting Ethernet frames with RF payload data may be used to transmit frame adjustment commands.

One or more transmitter devices can receive one or more frame adjustment commands. The transmitter device can respond to the receipt of a frame adjustment command by adjusting the start time of one or more framers in the transmitter device according to the commands. The adjustment to the start time may be performed by adjusting the counters in the framers according to the received command such that multiple frames received at the aggregation device are aligned in time.

Figure 4:
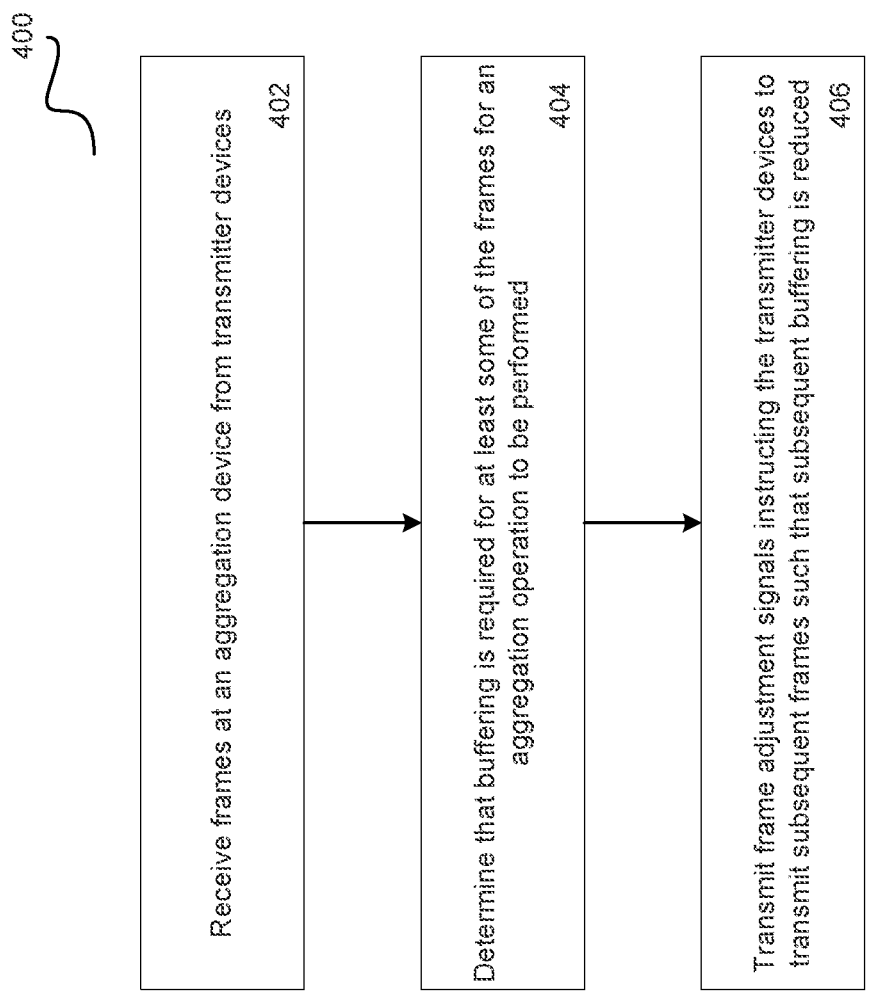
FIG. 4 shows a flow chart of an example of a process for optimizing frame start transmission in a telecommunication system according to one aspect of the present disclosure.

FIG. 4 depicts a flow chart of an example of a process 400 for optimizing frame starts in a telecommunication system. The process 400, which is described in reference to FIG. 2, may be implemented by a FAP 202 in an aggregation device 200.

In block 402, the aggregation device 200 receives frames from transmitters 210, 230. The frames may be received over any medium for example a wireless link. In some examples, the frames may be part of an uplink signal transmitted from remote units. In other examples, the frames may be part of a downlink signal transmitted from base stations.

In block 404, the FAP 202 determines that buffering is required for at least some of the frames for an aggregation operation to be performed by the aggregation device 200. In some aspects, an aggregation operation may include summing the frames. Summing can include aligning the frames. The FAP 202 may determine that the frames are not received in alignment and require buffering prior to being summed. In additional or alternative aspects, an aggregation operation may include time-division multiplexing. In these aspects, the frames may need to be sequenced in accordance with a sequence of time slots for the time-division multiplexing operation. The FAP 202 may determine that the frames are not received in a correct sequence of time slots for the time-division multiplexing operation and that buffering is required.

Figure 5:
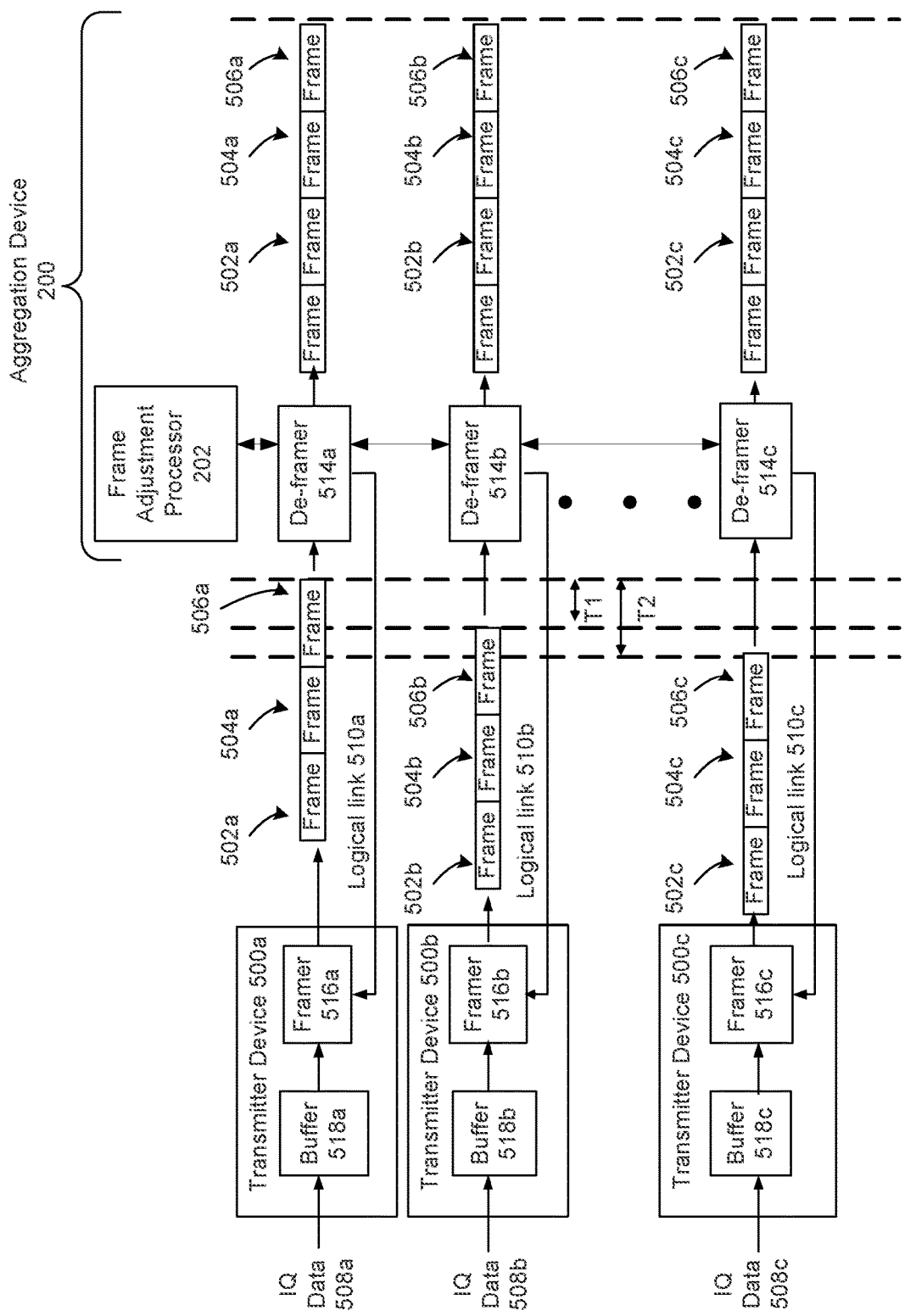
FIG. 5 shows a block diagram of an example of frames that can be aligned based on commands to advance or delay the frames according to one aspect of the present disclosure.
Figure 6:
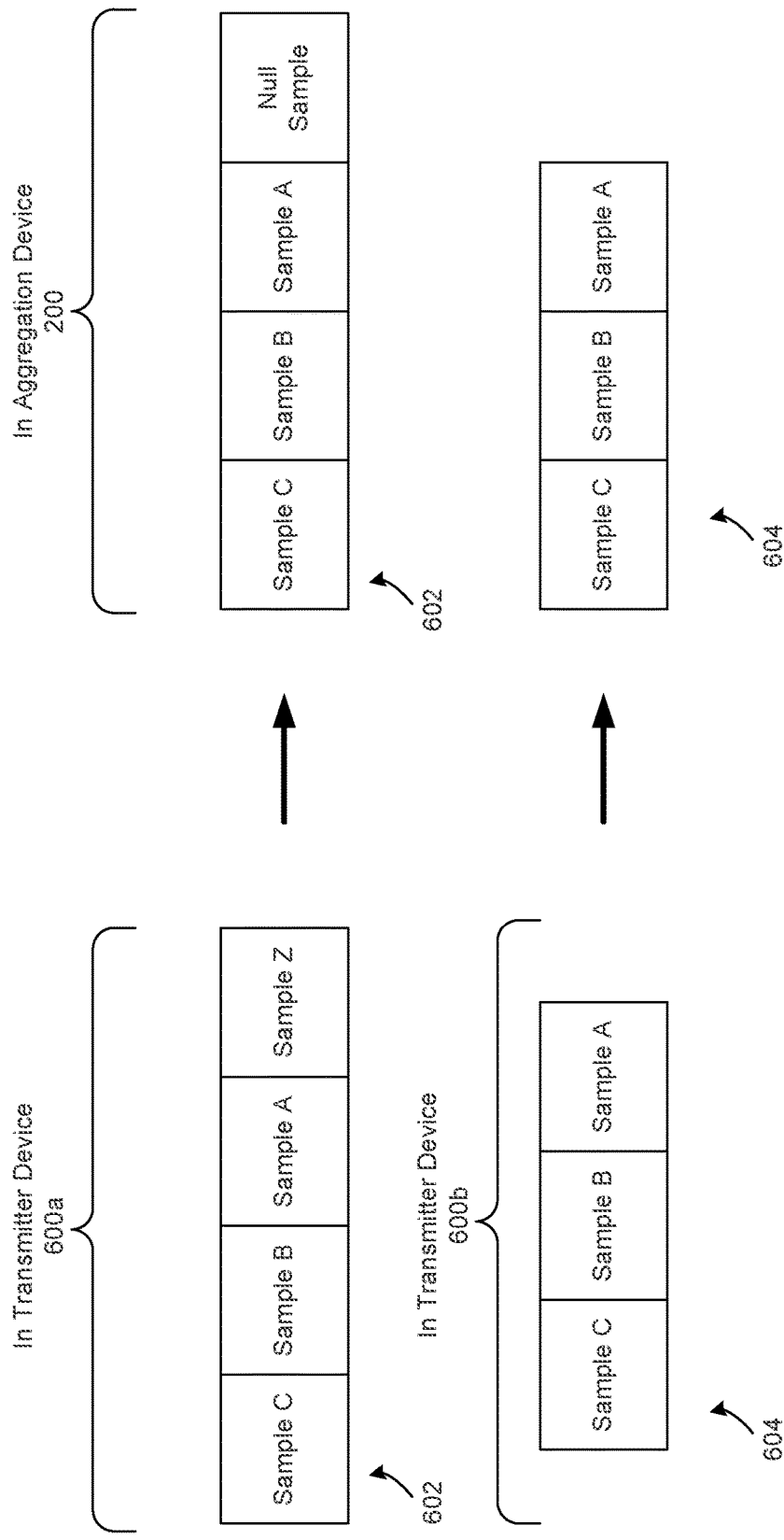
FIG. 6 shows a block diagram of an example of frames that can be aligned based on lengthening or shortening a frame string according to one aspect of the present disclosure.

In block 406, the FAP 202 transmits frame adjustment signals to instruct the transmitter devices (e.g. downlink transmitters 210, uplink transmitters 230) to transmit subsequent frames such that subsequent buffering is reduced. The frame adjustment signals can include one or more commands. Some examples include frame adjustment signals to delay or advance subsequent frames, as depicted in FIG. 5. Other examples include frame adjustment signals to lengthen or shorten the payload field in subsequent frames, as depicted in FIG. 6. Any combination of frame adjustment signals may be transmitted.

FIG. 5 depicts an example of the FAP 202 in communication with transmitter devices 500a-c to align frames. In the example depicted in FIG. 5, a first set of frames 502a-c, a second set of frames 504a-c, and a third set of frames 506a-c are to be aligned for aggregation.

The FAP 202 can communicate frame adjustment commands to the transmitter devices 500a-c via logical links 510a-c with the transmitter devices 500a-c. The logical link 510a-c may exist between a de-framer 514a-c in the aggregation device 200 and a framer 516a-c in the transmitter devices 500a-c. In other examples, the FAP 202 may be directly linked to a component of the transmitter devices 500a-c. A frame adjustment command received by a first transmitter device 500a can cause a first stream with frames 502a, 504a, 506a to be transmitted at a first point in time. A frame adjustment command received by a second transmitter device 500b can cause a second stream with frames 502b, 504b, 506b to be transmitted at a second point in time. A frame adjustment command received by a third transmitter device 500c can cause a third stream with frames 502c, 504c, 506c to be transmitted at a third point in time. The aggregation device 200 can receive the three streams at the same time such that the frames 502a-c are aligned with one another, the frames 504a-c are aligned with one another, and the frames 506a-c are aligned with one another. In some aspects, receiving multiple streams simultaneously or near simultaneously can involve multiple streams being received within a sufficiently small time period that buffering by the aggregation device 200 can be minimized or otherwise reduced below a threshold level.

Although FIG. 5 depicts an alignment of the frames, other frame sequencing is possible. For example, the frame adjustment commands can be used to control any suitable timing at which different frames or samples within frames are received by the aggregation device 200. In some aspects, the timing can be controlled such that different frames or samples within frames are received by the aggregation device 200 in a sequence corresponding to a sequence of time slots used in a time-division multiplexing operation performed by the aggregation device 200.

In some aspects, an aggregation device 200 may combine downlink data received from multiple base stations for transmission using time-division multiple access. For example, different downlink data from different base stations 102a-e depicted in FIG. 1 may be inserted into different time slots of an Ethernet field used for payload data. In this aggregation operation, buffering can be reduced at the aggregation device 200 if the Ethernet frames are received by the aggregation device 200 at the different times. For example, first downlink data may be included in a first time slot of a downlink Ethernet frame generated by the aggregation device 200, and second downlink data may be included in a second time slot. In this example, buffering may be reduced at the aggregation device 200 if a first Ethernet frame including the first downlink data can be received before a second Ethernet frame including the second downlink data.

In additional or alternative aspects, adjustment operations in addition to arranging the frame starts may be performed to reduce delay. For example, radio frequency ("RF") signals or in-phase and quadrature ("IQ") data 508a-c may be received by a transmitter device 500a-c at a constant rate. The received data can be buffered in the event of a frame-delay. For example, if a frame is delayed by one bit-time and the entire payload of the frame is utilized, the corresponding IQ data 508a-c for that frame can also delayed.

This delay in the corresponding IQ data 508a-c can be addressed by resetting a buffer 518a-c (e.g., a first-in/first out buffer) that holds the IQ data 508a-c after the calibration operation performed using the FAP 202. Resetting the buffer 518a-c can reduce or minimize the buffering requirement for the IQ data 508a-c. Resetting the buffer 518a-c can also reduce or prevent unnecessary buffering that may result from the frame-advance and frame-delay events. In some aspects, the calibration operation performed using the FAP 202 may occur at the start-up of the telecommunication system. The buffer reset event can be performed without impacting operation of the telecommunication system FIG. 6 depicts frames being transmitted with different payload lengths that illustrate another implementation of block 406, in which the transmitter devices are instructed to vary the length of payload fields. In some aspects, varying the lengths of payload fields to compensate for delays in the telecommunication system can allow frame adjustment commands to be implemented during runtime of the telecommunication system. The runtime of the telecommunication system can include, for example, a period after a start-up phase and during normal operation of the telecommunication system.

A first frame 602 may be transmitted from a first transmitter device 600a to an aggregation device 200 more quickly than a second frame 604 is transmitted from a second transmitter device 600b to the aggregation device 200. The first transmitter device 600a can respond to receiving a frame adjustment command from the aggregation device 200 by lengthening the payload field of the frame 602 to include four samples (samples A, B, C, and a sample Z) as compared to the payload field of the frame 604, which can include three samples (e.g., samples A, B, and C). The difference in payload field length can offset the delays in the telecommunication system such that a first sample A from frame 602 can be processed by the aggregation device 200 at or near the same time that a second sample A from frame 604 can be processed by the aggregation device 200.

Although FIG. 6 depicts the use of varying payload lengths to align samples from different frames, other implementations are possible. For example, a DAS can also use varying payload lengths to sequence samples from different frames for other purposes (e.g., time-division multiplexing).

In some aspects, a synchronous link may be maintained between an aggregation device 200 and a transmitter device 600a, 600b if link faults are encountered. For example, an aggregation device 200 can receive data including one or more Ethernet frames from a transmitter device 600a, 600b. Each Ethernet frame can be divided into control fields and payload fields. For example, a first Ethernet frame in the sequence of Ethernet frames can include a start-of-frame field and an Ethernet type-or-length field carrying frame identifier information. The first Ethernet frame can also include a payload field carrying wireless communication information. The sequence of Ethernet frames can also be associated with a frame repetition rate. For example, if synchronous Ethernet is used and each frame is configured to be the same length, the elements of the Ethernet frame structure can occur at a periodic rate equal to the frame repetition rate. If an Ethernet frame is sent by a transmitter device 600a-b every X µs and sent at Y MBits/second, then the payload fields for each Ethernet frame can occur every X µs and at every X×Y bits.

The aggregation device 200 can extract the payload information from the first received Ethernet frame based on the start-of-frame field. The information extracted from the start-of-frame field allows the aggregation device 200 to determine the start position of the frame. As each Ethernet frame in the sequence of Ethernet frames has a fixed amount of overhead (e.g., fixed control fields), the payload field in a synchronous stream of Ethernet frames can be located at the same position in each received Ethernet frame. The aggregation device 200 can determine the location of the payload field using the extracted information from the start-of-frame field. For example, an Ethernet frame may include a start-of-frame field that is one byte in length, a destination address field that is six bytes in length, a source address field that is six bytes in length, an 802.1Q tag field that is four bytes in length, and an Ethernet type or length field that is two bytes in length. In this example, each payload field in a synchronous sequence of Ethernet frames can be detected within 19 bytes of the start of the start-of-frame-fields.

The aggregation device 200 can determine, after a period of time corresponding to the frame repetition rate, whether an additional start-of-frame field is detected. If the length of each Ethernet frame in the sequence of Ethernet frames is the same, each of the one or more Ethernet frames in the sequence of Ethernet frames can be transmitted at the same rate (e.g., every X µs as indicated above). In a synchronous stream of Ethernet frames, the start-of-frame field for each Ethernet frame can occur at the same periodic rate. The aggregation device 200 can scan for the additional start-of-frame field after the expected amount of time has passed from the receipt of the last start-of-frame field (e.g., X µs). In some aspects, a counter can be started in the receiving aggregation device 200, the counter counting down with a period equal to the frame repetition rate. After a period of time corresponding to the frame repetition rate (e.g., conclusion of the counter), the aggregation device 200 can scan incoming data signals for an identifier that can correspond to a start-of-frame field for an Ethernet frame.

If the sequence of Ethernet frames follows a repeating pattern of Ethernet frame lengths, the aggregation device 200 can determine the additional start-of-frame field based on the pattern. The aggregation device 200 can determine the pattern of frame lengths in multiple ways. For example, in some aspects, the length of an Ethernet frame can be encoded in the Ethernet type or length field. The aggregation device 200 can also determine the length of the Ethernet frame by calculating the amount of bits between the first received start-of-frame field and the end of the Ethernet frame. The lengths of sets of Ethernet frames can also be fixed and known by the aggregation device 200. For example, the aggregation device 200 can determine that the sequence of Ethernet frames includes two Ethernet frames of bit length X followed by two Ethernet frames of bit length Y. By determining the pattern of frame lengths for the sequence of Ethernet frames, the aggregation device 200 can scan incoming data signals for the additional start-of-frame field after the expected amount of bits are received.

An additional start-of-frame field can indicate the start of an additional Ethernet frame from the sequence of Ethernet frames. In response to detecting the additional start-of-frame field, the aggregation device 200 can extract data from the payload field from the additional Ethernet frame as described above. After extracting the payload data from the additional Ethernet frame, the process can repeat and the aggregation device 200 can determine whether a third start-of-frame field is detected, corresponding to the next Ethernet frame in the sequence of Ethernet frames.

In some aspects, bit errors can be present in the frame structure. These errors can reduce the ability of a receiver in the aggregation device 200 to detect an additional start-of-frame field in the sequence of Ethernet frames. If the additional start-of-frame field is not detected, the aggregation device 200 can predict the value for the additional start-of-frame field. The location of the additional start-of-frame field for the next incoming Ethernet frame can be predicted based on the information extracted from the previously detected start-of-frame field. As explained above, in the sequence of Ethernet frames, each start-of-frame field for each Ethernet frame can occur at a pre-determined periodic rate, which allows the aggregation device 200 to predict the start of each Ethernet frame. The aggregation device 200 can predict the additional start-of-frame field by determining that the period of time corresponding to the frame repetition rate has passed. For example, if the aggregation device 200 previously received a start-of-frame field at 2 μs and each Ethernet frame is transmitted at a periodic rate of 4 μs, then the aggregation device 200 can predict that an additional start-of-frame field for the next Ethernet frame can occur at 6 μs.

Based on the predicted additional start-of-frame field, the aggregation device 200 can extract the payload data of the next Ethernet frame as described above. For example, the aggregation device 200 can find the payload field of the next Ethernet frame at 19 bytes after the additional start-of-frame field.

In some aspects, the aggregation device 200 can maintain a frame error counter. In response to detecting the first start-of-frame field, the aggregation device 200 can set the value of the frame error counter to zero. After extracting payload information from the first received Ethernet frame, if the next start-of-frame field is not detected, then the aggregation device 200 can increment the frame error counter. This process can repeat for every successive Ethernet frame until the frame error counter exceeds a programmable threshold. The programmable threshold can indicate that the start-of-frame field has not been detected in the expected location for the threshold amount of successive frames. For example, if the frame error counter reaches a programmable threshold value of five, then the frame error counter can indicate that the start-of-frame field has not been detected for five successive frames. In response to the frame error counter exceeding the programmable threshold, the aggregation device 200 can search the received data for the start-of-frame bit pattern. For example, the aggregation device 200 can analyze the bit stream of the incoming data to determine if another start-of-frame field can be detected. If detected, the frame error counter can be set to zero and the process can start again. A frame error counter can thus be used to re-synchronize the communication link between a transmitter unit and an aggregation device 200. In other aspects, re-synchronization of the communication link can be based on the percentage of missed start-of-frame fields.

In some aspects, the length of each Ethernet frame in the synchronous sequence of Ethernet frames may not be the same value. An aggregation device 200 can determine the location of a start-of-frame field based on a pattern found in previously received Ethernet frames. For example, the Ethernet frames in a sequence of Ethernet frames can include a repetitive pattern of frame lengths. Based on the repetitive pattern of frame lengths, the aggregation device 200 can predict the position of additional start-of-frame fields. In other aspects, other frame fields can be used to determine the Ethernet frame structure and used to test if synchronization is valid. For example, the preamble field, source address field, or destination address field can be used to predict the position of additional Ethernet frames in a sequence of Ethernet frames.

In some cases, the entire payload of the frame may not be utilized. In these cases, the frame payload size can be extended or reduced in real-time to compensate for a frame adjustment command. For example, if a frame-delay command is received at the transmitter device and indicates a frame delay of one bit-time, the transmitter device can insert an extra IQ data into the next frame to compensate for the change in the frame start time. Doing so can prevent data from being lost in response to implementing the frame adjustment command. In some aspects, the link bit period and the IQ bit period can be different. The transmitter device can use a smaller buffer (e.g., a FIFO buffer) for relatively small buffering to mitigate the differences between the two rates. If the small buffer becomes full or otherwise receives a threshold amount of data, the extra IQ data can be inserted or removed from the frame to maintain a real-time data flow.

In some aspects, unnecessary delay in the transmitter device may be prevented by resetting a buffer in response to receiving a frame adjustment command by the transmitter device to prevent unnecessary delay/buffering in the transmitter device.

In some aspects, one or more of the calibration operations described above can be performed during a startup phase of the telecommunication system.

After block 406 in FIG. 4 or one or more calibration operations such as those depicted in FIG. 5 and FIG. 6, the FAP can enter a monitoring mode. In the monitoring mode, the FAP can perform one or more operations for ensuring that alignment among frames is maintained. For example, the FAP can monitor incoming frames using the start-of-frame indicator. The FAP can determine from the monitored frames that one or more frames are not aligned. The FAP can respond to determining that one or more frames are not aligned by performing a new calibration operation. In some aspects, the FAP may transmit a frame adjustment command to the transmitter device having the misadjusted frame. The FAP can transmit the frame adjustment commands to realign frames received from the transmitter device without affecting other transmitter devices that have transmitted properly adjusted frames.

In the uplink direction, the FAP can be included in or communicatively coupled to the head-end unit or the expansion unit. In some aspects, remote units may transmit the frames with different start times if a start time for frames from one or more remote units is not aligned with a start time for frames from one or more other remote units. In additional or alternative aspects, remote units may transmit the frames with different start times due to differences in cable length used to connect different remote units to an aggregation device (e.g., a head-end unit or an expansion unit). The FAP can transmit frame adjustment commands to inform one or more framers in one or more remote units to advance or delay the start time of frames. The amount of advancement or delay is indicated by the time parameter in the frame adjustment command.

In some aspects, the transmission time of frames can be adjusted using an iterative approach. Each frame adjustment command can indicate that the FAP in the aggregation device has requested that the transmitter device advance or delay frames by one bit. In some aspects, the FAP may measure the frame alignment after each frame adjustment command. In additional or alternative aspects, the FAP may transmit the frame adjustment commands in a stream. For example, if the frame from one source is five bit-times too early, the FAP can transmit five frame-delay commands to the source. Each frame-delay command instructs the source to delay the frame start by one-bit time such that the cumulative effect of the five frame-delay commands is to delay the frame start by five bit-times.

The monitoring performed by the FAP can be tolerant to link errors. For example, high-speed digital links may be susceptible to link errors. In the event that an error occurs on the start-of-frame control word, the aggregation device can miss one or more start-of-frame control words from a transmitter device. In monitoring mode, the FAP can monitor the start-of-frame. The FAP can be configured to ignore N number of errors before taking action to calibrate and realign the frame. For example, the FAP may not respond to a first missed start-of frame in the event of a link error. In some aspects, the FAP can monitor the cyclic redundancy check errors for a frame payload to determine whether errors are present. In additional or alternative aspects, the FAP can monitor for control words that are inserted by the encoding (e.g., 8b/10b encoding) to monitor for errors.

Similar methods can be used if a base station is integrated into or communicatively coupled with the telecommunication system. For example, Common Public Radio Interface ("CPRI") frames from multiple base stations can be aligned to minimize delay and memory requirements. CPRI frames from multiple base stations can also be aligned for aggregation into a single digital stream for distribution through the telecommunication system.

Figure 7:
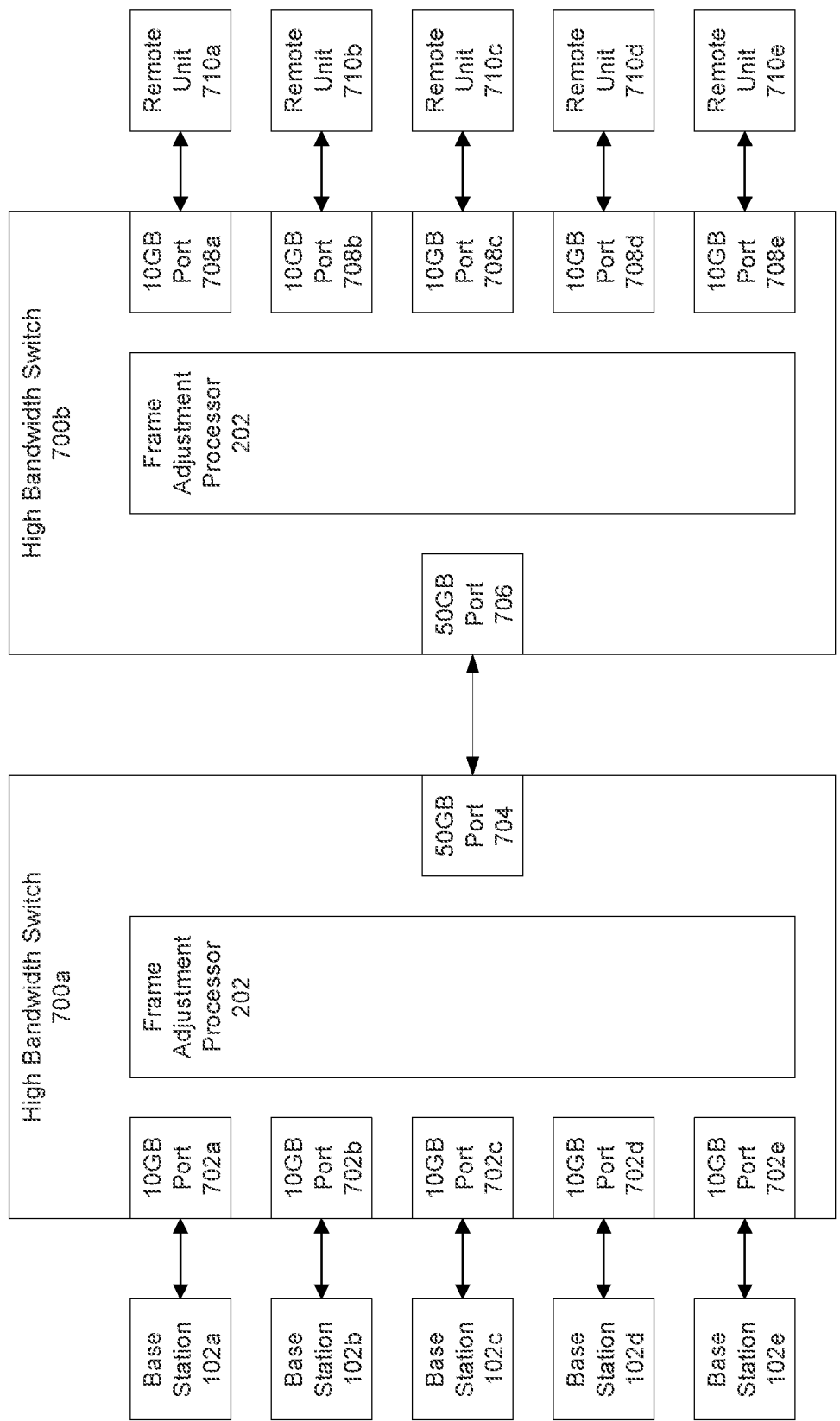
FIG. 7 shows a block diagram of an example of a high bandwidth switch as an aggregator that can receive five 10 Gb signals and transmit a 50 Gb signal according to one aspect of the present disclosure.

FIG. 7 depicts an example of high-bandwidth switches 700a-b used for transporting RF data via a DAS. Each high-bandwidth switch may have five 10 Gb ports 702a-e, 708a-e and one 50 Gb port 704, 706. Data received via the five 10 Gb ports 702a-e, 708a-e can be aggregated into combined data for transmission via the 50 Gb port 704, 706. In some aspects, the frames may be transmitted in a downlink direction from the base stations 102a-e to be aggregated in high-bandwidth switch 700a. In other aspects, the frames may be transmitted in an uplink direction from remote units 710a-e to be aggregated in high-bandwidth switch 700b.

In this example, it may be desirable to implement frame start optimization to minimize delay. The frame start time at the base stations 102a-e can be optimized such that minimal delay is required for the aggregation. For example, the frames can be aligned in time. Aligning the frames in time can reduce the buffering required for a summing aggregation operation.

Figure 8:
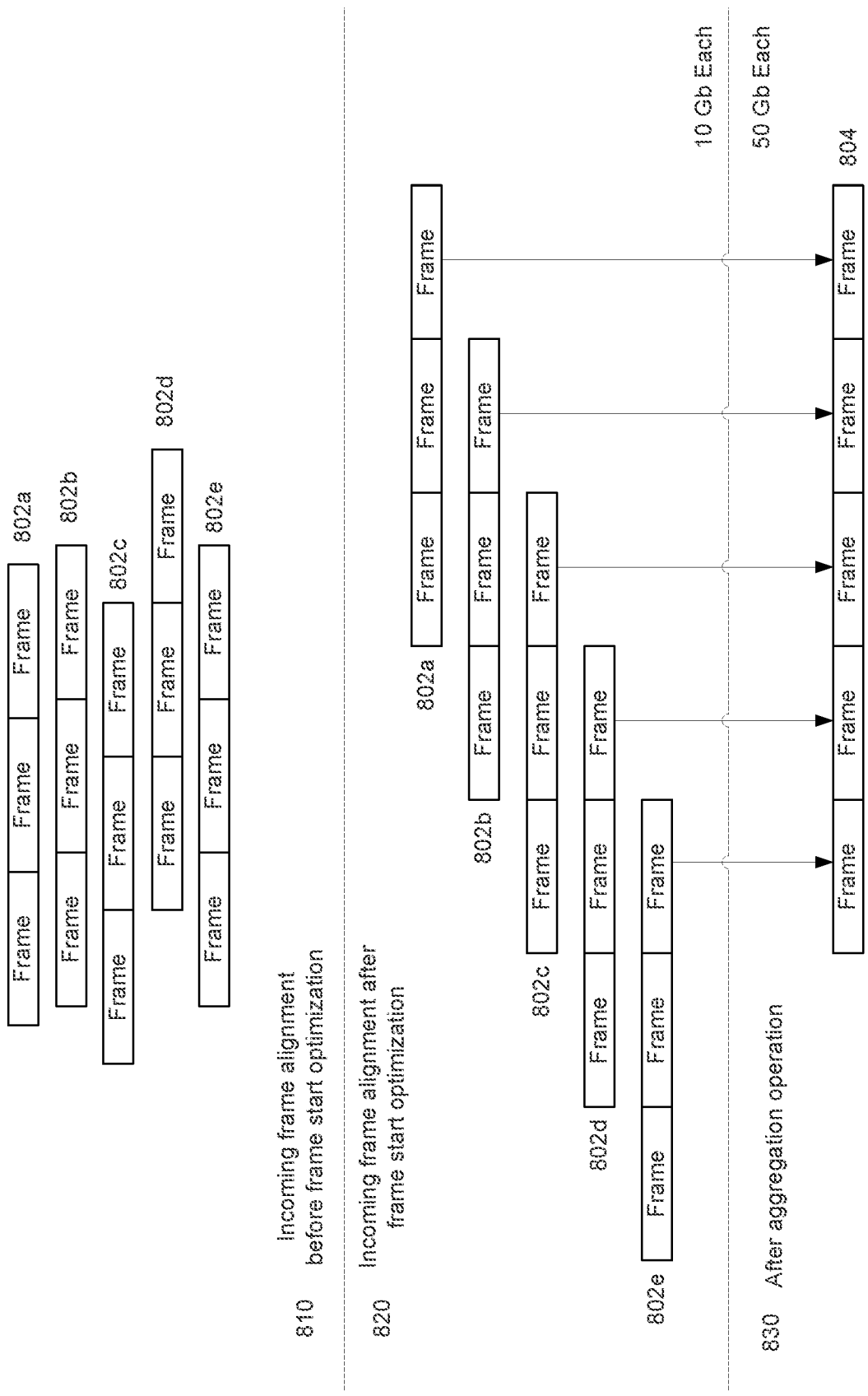
FIG. 8 shows a block diagram of frames before and after frame start alignment at a high bandwidth switch according to one aspect of the present disclosure.

FIG. 8, described in reference to FIG. 7, shows 10 Gb frame sets 802a-e during a first period 810 before frame start optimization and during a second period 820 after frame start optimization. The frame sets 802a-e in the period 810 before optimization may arrive at the high bandwidth switch 700a-b at random times if the start times for transmitting frames are not synchronized. In the period 820 after frame start optimization, the frame sets 802a-e arrive at the high bandwidth switch 700a-b such that no delay is required to re-form the new aggregated frame 804 at the higher rate. The frames can be added to the new frame using a multiplexer such that in a third period 830 after an aggregation operation, the new aggregated frame 804 has a 50 Gb bandwidth.

In additional or alternative aspects, the FAP can cause transmitter devices to change the lengths of payload fields in transmitted frames such that data that arrives at the aggregation device is properly sequenced to reduce or avoid buffering at the aggregation device. For example, differences in start times for different frames can be implemented by shortening or lengthening payload fields in those frames. Changing the length of a payload field, which can include digital samples representing a signal (e.g., RF data samples, IQ data samples, baseband data samples), can allow appropriate samples within a first frame that is received by the aggregation device to be aligned or sequenced with respect to other samples in a second frame that is received by the aggregation device. In one example, two or more frames are received at the aggregation device. Changing the length of a payload field in a first one of the frames may compensate for a delay in the DAS such that one or more samples from the first frame are properly aligned or sequenced with respect to one or more samples from a second one of the frames.

Figure 9:
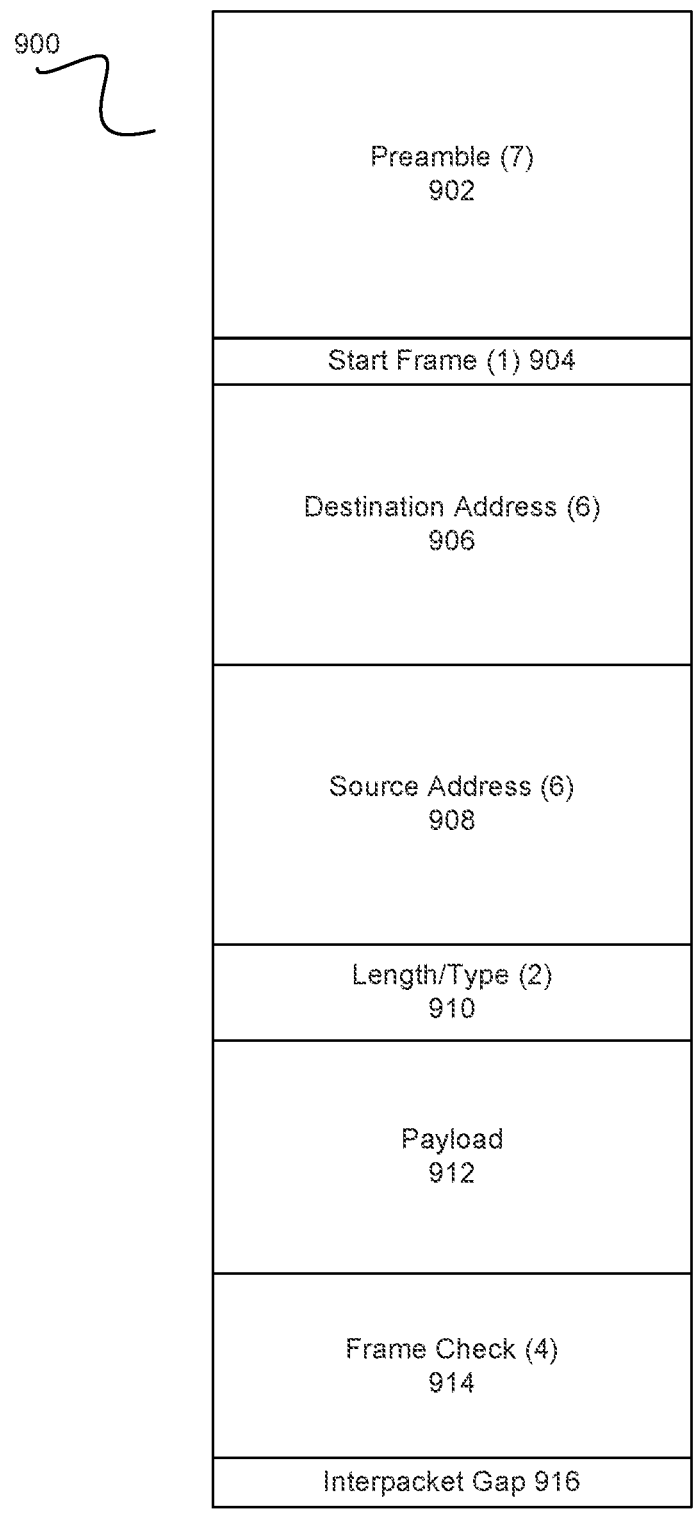
FIG. 9 shows a block diagram of an example of the frame structure for an Ethernet frame according to one aspect of the present disclosure.

FIG. 9 depicts an example of the frame structure for an Ethernet frame 900. The example depicted in FIG. 9 is the frame structure defined by the 802.3 Ethernet standard. But any suitable frame structure having a field with data indicating the start-of-frame time 904 can be used. The Ethernet frame 900 can begin with a seven-byte preamble 902. The preamble 902 may be an alternating pattern of ones and zeros that informs the receiving device that a frame is coming. The start-of-frame field 904 can be a one-byte control word that follows the preamble and that is used to indicate the start of the Ethernet frame. The next twelve bytes may include a destination address field 906 and source address field 908. The following two bytes are the length field 910 that can specify the number of bytes of data that follow this field. In other examples, the length field 910 is replaced by a type field that can indicate the upper-layer protocol to receive the data after Ethernet processing is complete. The payload field 912 follows the length field 910. A four-byte frame check field 914 can be used to check for errors that may have occurred to the frame. Additionally, the structure for an Ethernet frame 900 is defined by an inter-packet gap 916 present between frames. Other examples of suitable frame structures include frame structures used in SONET, CPRI, High-level Data Link Control ("HDLC"), or other protocols for communicating data in frames.

While the present subject matter has been described in detail with respect to specific aspects and features thereof, it will be appreciated that those skilled in the art, upon attaining an understanding of the foregoing may readily produce alterations to, variations of, and equivalents to such aspects and features. Each of the disclosed aspects, examples, and features can be combined with one or more of the other disclosed aspects, examples, and features. Accordingly, it should be understood that the present disclosure has been presented for purposes of example rather than limitation, and does not preclude inclusion of such modifications, variations, and/or additions to the present subject matter as would be readily apparent to one of ordinary skill in the art.

What is claimed is:

1. A method comprising:
    receiving, by an aggregation device in a telecommunication system, a first plurality of frames from a plurality of transmitter devices;
    determining that buffering is required for at least some frames of the first plurality of frames to sequence the first plurality of frames for a first aggregation operation performed by the aggregation device, wherein the first aggregation operation comprises a process that combines frames from transmitter devices; and
    in response to determining that the buffering is required, transmitting frame adjustment signals to the plurality of transmitter devices, wherein the frame adjustment signals instruct the plurality of transmitter devices to transmit subsequent frames such that the buffering is reduced for a subsequent aggregation operation performed by the aggregation device using the subsequent frames, wherein the frame adjustment signals include commands that are based on the buffering required for the at least some frames of the first plurality of frames.

2. The method of claim 1, wherein the plurality of transmitter devices comprises a plurality of remote units of the telecommunication system, wherein the first and subsequent aggregation operations comprise summing operations, and wherein the frame adjustment signals instruct the remote plurality of remote units to adjust a transmission of a second plurality of frames such that the frames of the second plurality of frames are simultaneously received by the aggregation device.

3. The method of claim 1, wherein the plurality of transmitter devices comprises a plurality of base stations communicatively coupled to a distributed antenna system in the telecommunication system, wherein the first and subsequent aggregation operations comprise respective time-division multiplexing operations, and wherein the frame adjustment signals instruct the base stations to adjust a transmission of a second plurality of frames such that the second plurality of frames are received in sequence corresponding to a sequence of time slots for a time-division multiplexing operation.

4. The method of claim 1, wherein at least one of the frame adjustment signals comprises a command to delay a time at which at least one of a second plurality of frames is transmitted.

5. The method of claim 1, wherein at least one of the frame adjustment signals comprises a command to advance a time at which at least one of a second plurality of frames is transmitted.

6. The method of claim 1, wherein at least one of the frame adjustment signals comprises a command to increase a length of a payload field in at least one of a second plurality of frames.

7. The method of claim 1, wherein at least one of the frame adjustment signals comprises a command to decrease a length of a payload field in at least one of a second plurality of frames.

8. A telecommunication system comprising:
    an aggregation device configured to receive a first plurality of frames from a plurality of transmitter devices and configured to perform aggregation operations; and
    a frame adjustment processor for being communicatively coupled to the plurality of transmitter devices, the frame adjustment processor being configured to:
        determine that buffering is required for at least some frames of the first plurality of frames to sequence the first plurality of frames for a first aggregation operation performed by the aggregation device; and
        transmit frame adjustment signals to the plurality of transmitter devices to instruct the plurality of transmitter devices to transmit subsequent frames such that buffering is reduced for a subsequent aggregation operation performed by the aggregation device using the subsequent frames, wherein the frame adjustment signals include commands that are based on the buffering required for the at least some frames of the first plurality of frames.

9. The telecommunication system of claim 8, wherein the plurality of transmitter devices comprises a plurality of remote units of the telecommunication system, the first and subsequent aggregation operations comprise respective summing operations, and the frame adjustment signals comprise instructions to adjust transmission of a second plurality of frames such that the frames of the second plurality of frames are simultaneously received by the aggregation device.

10. The telecommunication system of claim 8, wherein the plurality of transmitter devices comprises a plurality of base stations communicatively coupled to a distributed antenna system in the telecommunication system, the first and subsequent aggregation operations comprise respective time-division multiplexing operations, and the frame adjustment signals comprise instructions to adjust transmission of a second plurality of frames such that the second plurality of frames is received in sequence corresponding to a sequence of time slots for a time-division multiplexing operation.

11. The telecommunication system of claim 8, wherein at least one of the frame adjustment signals comprises at least one of a command to either advance or delay a time at which at least one of a second plurality of frames is transmitted.

12. The telecommunication system of claim 8, wherein at least one of the frame adjustment signals comprises at least one of a command to either increase or decrease a length of a payload field in at least one of a second plurality of frames.

13. The telecommunication system of claim 8, wherein the frames are Ethernet frames and the aggregation device comprises:
    a plurality of physical layers configured to receive a first plurality of Ethernet frames from transmitter devices;
    a plurality of de-framers each communicatively coupled to at least one physical layer and configured to extract payload data from Ethernet frames of the plurality of Ethernet frames; and
    an aggregator communicatively coupled to the plurality of de-framers for performing an aggregation operation on the payload data.

14. The telecommunication system of claim 8, wherein the aggregation device is a switch configured to combine received frames at a first bandwidth to produce a higher bandwidth frame.

15. A non-transitory computer-readable medium having instructions stored thereon that are executable by a frame adjustment processor to perform operations, the operations comprising:
- determining that buffering is required for at least some frames of a first plurality of frames received by an aggregation device to sequence the first plurality of frames for a first aggregation operation performed by the aggregation device;
- transmitting frame adjustment signals to a plurality of transmitter devices to instruct the plurality of transmitter devices to transmit subsequent frames to the aggregation device in a telecommunication system such that buffering is reduced for a subsequent aggregation operation performed by the aggregation device using the subsequent frames, wherein the frame adjustment signals include commands that are based on the buffering required for at least some frames of the first plurality of frames.

16. The non-transitory computer-readable medium of claim 15, wherein the operations further comprise:
- monitoring when first frames of a first plurality of frames, transmitted by the plurality of transmitter devices, are received at the aggregation device in the telecommunication system;
- determining that buffering is required for at least some first frames of the first plurality of frames to sequence the first plurality of frames for a first aggregation operation performed by the aggregation device; and
- calculating the frame adjustment signals with instructions to adjust transmission of subsequent frames such that buffering will be reduced for subsequent frames compared to the buffering required for the at least some first frames.

17. The non-transitory computer-readable medium of claim 16, wherein at least one of the frame adjustment signals comprises a command to delay a time at which at least one of a second plurality of frames is transmitted.

18. The non-transitory computer-readable medium of claim 16, wherein at least one of the frame adjustment signals comprises a command to advance the time at which at least one of a second plurality of frames is transmitted.

19. The non-transitory computer-readable medium of claim 16, wherein at least one of the frame adjustment signals comprises a command to increase a length of a payload field in at least one of a second plurality of frames.

20. The non-transitory computer-readable medium of claim 16, wherein at least one of the frame adjustment signals comprises a command to decrease a length of a payload field in at least one of a second plurality of frames.

* * * * *